(12) United States Patent
Lussier et al.

(10) Patent No.: US 10,189,271 B2
(45) Date of Patent: Jan. 29, 2019

(54) NON-FOAMING AQUEOUS PARTICLE-FREE INKJET INK COMPOSITIONS

(71) Applicant: Eastman Kodak Company, Rochester, NY (US)

(72) Inventors: Barbara Boland Lussier, Rochester, NY (US); Daniel Talbot Linehan, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 82 days.

(21) Appl. No.: 15/240,213

(22) Filed: Aug. 18, 2016

(65) Prior Publication Data

US 2018/0051184 A1    Feb. 22, 2018

(51) Int. Cl.
| | |
|---|---|
| B41J 2/21 | (2006.01) |
| C09D 11/033 | (2014.01) |
| C09D 11/102 | (2014.01) |
| C09D 11/107 | (2014.01) |
| C09D 11/322 | (2014.01) |
| C09D 11/38 | (2014.01) |
| C09D 11/40 | (2014.01) |

(52) U.S. Cl.
CPC ........... B41J 2/2114 (2013.01); B41J 2/2107 (2013.01); C09D 11/033 (2013.01); C09D 11/102 (2013.01); C09D 11/107 (2013.01); C09D 11/322 (2013.01); C09D 11/38 (2013.01); C09D 11/40 (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 5,764,263 A | 6/1998 | Lin | |
| 6,000,793 A | 12/1999 | Inamoto | |
| 6,464,348 B1 | 10/2002 | Kasperchik et al. | |
| 6,543,888 B2 | 4/2003 | Nishita | |
| 6,604,819 B2 | 8/2003 | Nishita | |
| 6,723,784 B2 | 4/2004 | Ito et al. | |
| 6,794,425 B1 | 9/2004 | Ellis et al. | |
| 6,863,392 B2 | 3/2005 | Shimomura et al. | |
| 6,877,850 B2 | 4/2005 | Ishimoto et al. | |
| 7,015,259 B2 | 3/2006 | Kataoka et al. | |
| 7,025,818 B2* | 4/2006 | Miyamoto | C09D 11/328 106/31.5 |
| 7,060,740 B2 | 6/2006 | Kataoka et al. | |
| 7,261,405 B2 | 8/2007 | Ohya et al. | |
| 7,273,276 B2 | 9/2007 | Kida et al. | |
| 7,304,099 B2 | 12/2007 | Gore | |
| 7,404,849 B2 | 7/2008 | Jackson et al. | |
| 7,411,011 B2 | 8/2008 | Vincent et al. | |
| 7,537,650 B2 | 5/2009 | Szajewski et al. | |
| 7,772,298 B2 | 8/2010 | Kataoka et al. | |
| 7,922,800 B2 | 4/2011 | Bauer et al. | |
| 7,997,714 B2 | 8/2011 | Ma et al. | |
| 8,187,371 B2 | 5/2012 | Brust et al. | |
| 8,192,008 B2 | 6/2012 | Brust et al. | |
| 8,240,835 B2 | 8/2012 | Iwao | |
| 8,349,211 B2 | 1/2013 | Cai | |
| 8,455,570 B2* | 6/2013 | Lindstrom | C09D 11/324 523/160 |
| 8,641,180 B2 | 2/2014 | Komatsu | |
| 8,814,340 B2 | 8/2014 | Goto | |
| 8,955,955 B2 | 2/2015 | Mimura et al. | |
| 9,033,486 B2 | 5/2015 | Symkens et al. | |
| 2003/0166742 A1 | 9/2003 | Hirasa et al. | |
| 2004/0011248 A1 | 1/2004 | Taguchi et al. | |
| 2005/0166794 A1 | 8/2005 | Bauer | |
| 2006/0100306 A1* | 5/2006 | Yau | C09D 11/40 523/160 |
| 2006/0100308 A1 | 5/2006 | Yau et al. | |
| 2006/0205840 A1 | 9/2006 | Kato et al. | |
| 2006/0223908 A1* | 10/2006 | Szajewski | C09D 11/40 523/160 |
| 2007/0052785 A1 | 3/2007 | Itoh et al. | |
| 2008/0207811 A1 | 8/2008 | Brust et al. | |
| 2009/0169748 A1 | 7/2009 | House et al. | |

(Continued)

*Primary Examiner* — Manish S Shah

(74) *Attorney, Agent, or Firm* — J. Lanny Tucker

(57) ABSTRACT

Colorless or colored coatings can be ink jetted onto a substrate using an aqueous particle-free inkjet ink composition that has a viscosity of less than 5 centipoises, and that includes a combination of an anionic polyether polyurethane and an anionic acrylic polymer or anionic styrene-acrylic polymer, in a total amount of less than or equal to 20 weight %. The composition can be colorless (free of colorants) or it can contain a suitable colorant to provide a color image. The composition also includes a defoamer that has a hydrophilic-lipophilic balance value of at least 3 and up to and including 5, and which is present in an amount of at least 0.15 weight % and up to and including 1 weight %. Such composition can be used in inkjet printing methods including recirculation apparatus and methods, and can be provided as part of an ink set.

16 Claims, No Drawings

(56) References Cited

U.S. PATENT DOCUMENTS

| | | |
|---|---|---|
| 2009/0169749 A1 | 7/2009 | Brust et al. |
| 2009/0221736 A1 | 9/2009 | McCurry |
| 2009/0304927 A1 | 12/2009 | Kamibayashi et al. |
| 2011/0122180 A1 | 5/2011 | Cook et al. |
| 2012/0050380 A1 | 3/2012 | Falkner et al. |
| 2012/0120142 A1 | 5/2012 | Tom et al. |
| 2012/0236068 A1 | 9/2012 | Matsushita |
| 2012/0277366 A1* | 11/2012 | Mis .................... C08G 18/4854 524/507 |
| 2013/0222496 A1 | 8/2013 | Iu |
| 2013/0286086 A1 | 10/2013 | Kato et al. |
| 2013/0300799 A1* | 11/2013 | Mizutani .............. B41J 2/16505 347/30 |
| 2014/0231674 A1 | 8/2014 | Cook |
| 2015/0000559 A1 | 1/2015 | Mohapatra et al. |
| 2015/0126638 A1 | 5/2015 | Abergel et al. |
| 2015/0152281 A1 | 6/2015 | Iu et al. |
| 2015/0191031 A1 | 7/2015 | Ohta et al. |
| 2015/0273871 A1* | 10/2015 | Ohta ..................... B41J 11/002 428/203 |

\* cited by examiner

NON-FOAMING AQUEOUS PARTICLE-FREE INKJET INK COMPOSITIONS

RELATED APPLICATION

Reference is made to copending and commonly assigned U.S. Ser. No. 15/240,176 (filed on Aug. 18, 2016, by Lussier) and entitled "Method of Inkjet Printing a Colorless Ink," the disclosure of which is incorporated herein by reference.

FIELD OF THE INVENTION

This invention relates to aqueous particle-free inkjet ink compositions, ink sets, and methods for providing ink jetted images using same, and particularly to using such compositions in recirculating inkjet printing apparatus. In many embodiments, the aqueous particle-free inkjet ink compositions are colorless, meaning that they contain no colorants and can be used to provide glossy images. The noted aqueous particle-free inkjet ink compositions exhibit reduced foaming during manufacture and use due to the presence of a specific type of defoamer.

BACKGROUND OF THE INVENTION

Inkjet printing systems are generally of two types: drop-on-demand (DOD) printing systems and continuous inkjet (CIJ) printing systems. Inkjet printing is a standard method for printing an image such as a colored image onto a substrate wherein a stream of ink droplets is directed from a printing device to a receptive surface of a suitable receiver element or substrate. The direction of the stream of droplets can be controlled electronically causing the droplets to print the desired image or information on the substrate without requiring contract between the printing device and the receptive surface to which the ink is applied. Objects comprising substrates to which inkjet printing is well suited include but are not limited to, containers for consumer products, currency, draft checks, envelopes, letterhead, identification cards, lottery tickets, bank cards, identification strips, labels, brochures, signage, and other well-known materials.

Drop-on-demand printing systems are widely used in home or consumer inkjet printers and slower consumer printers, both of which have been available for several decades. As the name implies, this type of inkjet printing uses a print head that ejects drops of ink only when signaled to do so by a digital controller.

CIJ printing systems generally comprise two main components, a fluid system (including a recirculating main fluid supply or ink reservoir) and one or more print heads. Ink can be pumped through a supply line from the recirculating main fluid supply to a manifold that distributes the ink to a plurality of orifices, typically arranged in linear array(s), under sufficient pressure to cause ink streams to issue from the orifices of the print head(s). Stimulations can be applied to the print head(s) to cause those ink streams to form streams of uniformly sized and spaced drops that are deflected in a suitable manner, into printing or non-printing paths. Non-printing drops can be returned to the recirculating main fluid supply using a drop catcher and a return line. In contrast to DOD printing systems, CIJ printing systems can involve the use of a continuous stream of ink drops that are separated to discriminate between spaced printing drops and non-printing drops. This discrimination can be accomplished by electrostatically charging the drops and passing the charged drops through an electric field. Charged drops are deflected by a charge field and can be caught and returned to the reservoir of ink. Uncharged drops are printed on a substrate or receiver material. This discrimination can also be accomplished when the printhead digitally creates large and small drops. Small drops are deflected by an air current and returned to the reservoir of ink. Large drops, being less affected by the air current, are printed onto a substrate or receiver material. Some useful CIJ printing apparatus and printhead fabrication are described for example in U.S. Pat. No. 6,588,888 (Jeanmaire et al.) and U.S. Pat. No. 6,943,037 (Anagnostopoulos et al.).

Commercially available CIJ inks are mostly aqueous dye-based inks that exhibit a number of problems. In such dye-based inks, no particles are observable under the microscope. Although there have been many recent advances in the art of dye-based inkjet inks, such inks still suffer from deficiencies such as low optical densities on coated glossy paper and poor light-fastness. When water is used as the carrier, such inks also generally suffer from poor water fastness, poor smear resistance, and uncontrolled gloss.

To address many of these problems, pigment based inks have been developed and incorporated into commercial CIJ systems as noted in the patents cited above and the various publications cited therein. In addition, U.S. Pat. No. 7,537,650 (Szajewski et al.) describes inkjet sets containing a colored aqueous ink (with cationic coloring agent or pigment) and a substantially colorless aqueous ink that contains an anionic polymer or oligomer. Such inks can be applied in substantially an overlaying manner. Both inks are generally applied to the same areas of a receiver element so that the mixing of cationic and anionic materials in the inks provide a more consistent single color density on a variety of substrates, thereby reducing intercolor bleed and non-uniformities.

In general, such pigment-based colored inks can comprise a wide variety of colored pigments that can be chosen depending upon the specific application and performance requirements for the printing system and desired printing results. For example, such pigments can include but are not limited to, carbon black or other black pigments, red pigments, green pigments, blue pigments, orange pigments, violet pigments, magenta pigments, yellow pigments, and cyan pigments. The printed images using such pigment-based inks are generally desired to have a visual density of at least 0.5.

Colorless or invisible aqueous inkjet printer ink compositions containing various fluorescing pigments, and optionally colored non-fluorescing pigments, are described in U.S. Pat. No. 8,349,211 (Cai et al.) and in U.S. Patent Application Publication 2014/0231674 (Cook).

Various additives have been incorporated into both colored and colorless inkjet ink compositions to provide desired physical and chemical properties. For example, in some instances a defoamer (or antifoamant or defoaming agent) can be included in small amounts to reduce propensity to foaming during manufacture or use. It has been observed that when aqueous inkjet ink compositions are supplied from a recirculating main fluid supply and perhaps passed through one or more filters, known defoamers having a hydrophilic-lipophilic balance value below 3, are insufficient to keep foaming under control and as a result, such aqueous inkjet ink compositions cannot be readily used in such recirculating systems. Foaming can cause overflow of recirculating main fluid supplies and significant waste. It would be desirable to solve this problem so that foaming is not a problem in such recirculating ink jetting systems.

SUMMARY OF THE INVENTION

The present invention provides an aqueous particle-free inkjet ink composition that has a viscosity of less than 5 centipoises (0.005 N-sec) at 25° C., and comprises:

an anionic polyether polyurethane having an acid number of at least 50 and an anionic acrylic polymer or anionic styrene-acrylic polymer having an acid number of at least 50; wherein the weight ratio of the anionic polyether polyurethane to the anionic acrylic polymer or anionic styrene-acrylic polymer is from 1:9 to and including 9:1, and the total amount of the anionic polyether polyurethane and the anionic acrylic polymer or anionic styrene-acrylic polymer is less than or equal to 20 weight % based on the total aqueous particle-free inkjet ink composition weight, and a defoamer that has a hydrophilic-lipophilic balance value of at least 3 and up to and including 5, which defoamer is present in an amount of at least 0.15 weight % and up to and including 1 weight %, based on the total aqueous particle-free inkjet ink composition weight. Such composition can be colorless (free of colorants as described below) or it can be colored and contain one or more suitable non-particulate colorants as described below.

This invention also provides a method of inkjet printing, comprising:

providing a substrate, ink jetting any embodiments of the aqueous particle-free inkjet ink composition of the present invention onto the substrate from a recirculating main fluid supply containing the aqueous particle-free inkjet ink composition.

In some embodiments, such method can further comprise:

supplying the aqueous particle-free inkjet ink composition as a continuous stream from the recirculating main fluid supply, during ink jetting, breaking the continuous stream into both printing ink drops and non-printing ink drops; and collecting and returning the non-printing drops to the recirculating main fluid supply.

In addition, the present invention provides an ink set comprising at least the following individual inks:

1) the aqueous particle-free inkjet ink composition of claim 1; and 2) an aqueous color inkjet ink composition that comprises at least one colorant.

The aqueous particle-free inkjet ink compositions of the present invention are not susceptible to extensive foaming during use because of the presence of a unique defoamer having a hydrophilic-lipophilic balance (HLB) value of at least 3 and up to and including 5.

If the defoamer used in an aqueous particle-free inkjet ink composition has a hydrophilic-lipophilic balance (HLB) value below 3, the aqueous particle-free inkjet ink composition has tendencies to be filtered out during recirculation, to fail to form distinct drops during ink jetting, or to exhibit excessive merger (agglomeration) of multiple drops. If the defoamer used in the present invention has an HLB value greater than 5, the tendency for foaming is too great during recirculation and filtration in the inkjet printing system.

The present invention provides a number of advantages. The particular defoamer used in the aqueous particle-free inkjet ink composition has an HLB value of at least 3 and up to and including 5 and there is a balancing of anti-foaming and filtration properties so that the composition can be readily used in recirculating inkjet printing equipment and systems to achieve desired ink jetting without undesirable waste or plugging of recirculation filters. As noted above, known defoamers having lower HLB values are frequently removed from the formulation by adsorption to the filter media, resulting in foaming problems in such recirculating inkjet printing systems. The defoamers used in this invention have a unique balance of solubility in order to survive repeated filtration, to reduce foaming at reasonable concentrations, and to allow inkjet drop formation with low tendency for the drop coalescence.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described for any specific embodiment.

Definitions

As used herein to define various components of the aqueous particle-free inkjet ink compositions, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "aqueous particle-free inkjet ink composition" and "inkjet ink composition" are meant to refer to embodiments useful in the present invention.

As used herein, the parameter "acid number" (also known as acid value) is defined as the milligrams (mg) of potassium hydroxide required to neutralize 1 g of the described acidic polymer.

The aqueous particle-free inkjet ink compositions of the present invention can exhibit a "static surface tension" as measured using the standard Wilhelmy Plate method of less than 38 dynes/cm, or at least 30 dynes/cm and up to and including 36 dynes/cm. In many embodiments, the aqueous particle-free inkjet ink composition can exhibit a static tension that is less than the surface energy of the colored areas of the colored image created in the practice of the present invention. The surface energy of these colored areas can be extrapolated from that of the aqueous color inkjet ink compositions used to provide the colored areas.

The Wilhelmy Plate method is described for example, at http://www.kruss.de/services/education-theory/glossary/wilhelmy-plate-method/Butt, Hans-Jürgen; Graf, Karlheinz; Kappl, Michael (2006) and Physics and Chemistry of Interfaces (2nd rev). Weinheim: Wiley-VCH-Vert, p. 16.

The hydrophilic-lipophilic balance value ("HLB" value) is a known parameter that measures the degree of hydrophilicity or lipophilicity of different parts or regions of a molecule. The HLB value can typically be from 0 (representing a highly lipophilic, highly hydrophobic, or highly water-insoluble region or molecule) to 18 (representing a highly hydrophilic, oleophobic, or highly water-soluble region or molecule). It can be readily calculated using known calculations or experimentally determined and the HLB value of many compounds such as defoamers are known in the art.

The term "aqueous" in aqueous particle-free inkjet ink compositions of the present invention means that the water content is greater than 50 weight % based on the total composition weight. Thus, water is the predominant solvent.

Aqueous Particle-Free Inkjet Ink Compositions

The various embodiments of the aqueous particle-free inkjet ink compositions of the present invention exhibit each of the following common features but each embodiment need not have the same exact combination of features:

1) They can contain one or more non-particulate colorants such as dyes (defined in more detail below). By the terms "particle-free" and "non-particulate" in defining the aqueous particle-free inkjet ink compositions, it is meant that the compositions comprise less than 2 weight % of particles for any purpose. In many embodiments of the present invention, the aqueous particle-free inkjet ink compositions are substantially free of all visible colorants (both dyes and pigments) and are thus aqueous "colorless" particle-free inkjet ink compositions. By the term "substantially free," it is meant that any visible colorants are present in an amount such that the optical density of the aqueous colorless particle-free inkjet ink composition is less than 0.1, or even less than 0.05, as measured using a standard spectrophotometer.

2) In many embodiments, they are non-UV radiation curable meaning that they contain substantially no components that can be cured or crosslinked in response to UV irradiation. By the term "substantially no," it is meant that such UV-curable components are present in an amount of less than 0.5 weight %, or even less than 0.1 weight %, based on the total weight of the aqueous particle-free inkjet ink composition.

3) They have a viscosity of less than 5 centipoises (0.005 N-sec) at 25° C., or more likely less than or equal to 3 centipoises (0.003 N-sec), or even less than or equal to 2 centipoises (0.002 N-sec), measured at 25° C. using a standard viscometer.

4) They comprise one or more anionic polyether polyurethanes, at least one of which (and more likely, all) anionic polyether polyurethane has an acid number of at least 50, or of at least 60 and up to and including 150, or even at least 55 and up to and including 90, which polymeric materials are described in more detail below.

5) They comprise one or more anionic acrylic polymers or anionic styrene-acrylic polymers, at least one of which (and typically, all) anionic acrylic polymer or anionic styrene-acrylic polymer has an acid number of at least 50, or of at least 120 and up to and including 240, or even at least 160 and up to and including 220, which polymeric materials are described in more detail below.

6) They have a weight ratio of the total weight of the one or more anionic polyether polyurethanes to the total weight of the one or more anionic acrylic polymers or anionic styrene-acrylic polymers is from 1:9 and to and including 9:1, or more likely of from 1:3 and to and including 3:1. If there is too little of the anionic polyether polyurethanes, the aqueous particle-free inkjet ink composition can exhibit poor wet durability of the ink jetted color or colorless image as well as plugging of filters and other equipment during extended recirculation of the composition. If there is too little of the anionic acrylic polymers or anionic styrene-acrylic polymers, the aqueous particle-free inkjet ink composition can exhibit poor image gloss, dry rub durability of the inkjet printed color or colorless images, as well as the noted plugging problems during extended recirculation.

7) The have a total cumulative amount (weight) of the one or more anionic polyether polyurethanes and the one or more anionic acrylic polymers or anionic styrene-acrylic polymers is less than or equal to 20 weight %, or at least 5 weight % and up to and including 18 weight %, or at least 7 weight % and up to and including 12 weight %, all amounts being based on the total aqueous particle-free inkjet ink composition weight.

8) They are substantially free of waxes (including wax particles) such as those described in WO 2014/021840 (Iu et al.). The term "substantially free" means that waxes and wax particles are present in an amount of less than 0.10 weight % or even less than 0.05 weight %, based on the total weight of the aqueous particle-free inkjet ink composition.

Anionic polyether polyurethanes that are useful in the present invention are condensation polymers prepared using suitable compounds ("monomers") having at least two hydroxyl groups (for example, diols or triols) and compounds ("monomers") having at least two isocyanates groups (such as diisocyanates and triisocyanates), which condensation polymers have suitable acidic groups to provide the desired acid number of the resulting polymer. The acidic groups are desirably carboxylic acid groups but any type of acidic group can be used if desired. Suitable compounds having sufficient hydroxyl groups and compounds having sufficient isocyanate groups are well known in the art, and any of these compounds can be substituted with one or more suitable acidic groups such as carboxylic acid groups. Not all of such compounds, however, need be substituted with the anionic groups. Such anionic polyether polyurethanes are therefore generally dispersible within the aqueous particle-free inkjet ink compositions without the need for separate dispersing agents ("dispersants").

The useful anionic polyether polyurethanes can also comprise recurring units derived from monomers that do not contain acidic groups but can have multiple hydroxyl groups are often known as polyol or polyhydroxyl derivatives of polyethers in U.S. Pat. No. 8,430,492 (Falkner et al.), the disclosure of which is incorporated herein by reference.

Particularly useful anionic polyether polyurethanes contain a polyether diol unit and generally have a molecular weight ($M_w$) of at least 10,000 Daltons and up to and including 30,000 Daltons or at least 15,000 Daltons and up to and including 25,000 Daltons, as measured for example by gel permeation chromatography (GPC).

Particularly useful polyether polyurethanes can be individually represented by the following Structure (I):

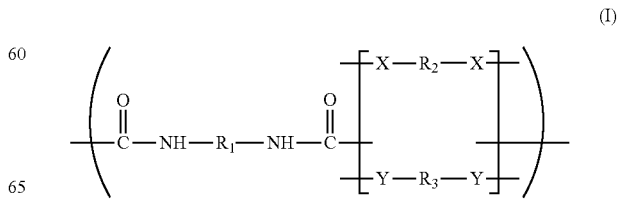

wherein $R_1$ is the central portion of recurring units derived from a polyisocyanate, $R_2$ represents a recurring unit derived from a polyether and having a molecular weight of at least 250 Daltons and up to and including 2900 Daltons, $R_3$ represents a central portion of a recurring unit containing an acidic group, and X and Y can be the same or different and are oxygen or nitrogen as long as at least one of X and Y is oxygen.

For example, $R_1$ can be a divalent, substituted or unsubstituted hydrocarbon group including divalent hydrocarbon groups comprising 1 to 20 carbon atoms in the chain and one or more unsubstituted or substituted alicyclic, aliphatic, or aromatic groups, for example, as substituted or unsubstituted 1,4-arylene-methylene-1,4-arylene, substituted or unsubstituted 1,4-cyclohexylene-methylene-1,4-cyclohexylene, substituted or unsubstituted n-hexylene, and substituted or unsubstituted 5-methyl-4,4-dimethyl-2,5-hexylene-methylene.

In Structure (I), $R_2$ can be a prepolymer comprising ethylene oxide, propylene oxide, tetramethylene oxide, or a mixture thereof that can be introduced into the polyurethane using any suitable polyol. For example, the polyether segment can be introduced into the polyurethane backbone by using a prepolymer with both ends terminated with a hydroxyl (diol) or an amino (diamine) group. Such prepolymers are known as polyols and polyamines. Useful polyether diols and diamines are sold under the tradenames TERATHANE® (Dupont) and JEFFAMINE®, for example the D, ED, and M series compounds (Huntsman). Another useful polyether diamine is a polytetrahydrofuran bis(3-aminopropyl) terminated having a molecular weight of about 1,000 Daltons. Mixtures of these various reactants can be used if desired.

In Structure (I), $R_3$ can be obtained from polyols comprising phospho, carboxy, or sulfo groups, or a mixture of such groups. Polyols comprising carboxy groups include but are not limited to, 2,2'-bis(hydroxymethyl)propionic acid, 2,2'-bis(hydroxymethyl)butanoic acid, and hydroxyether of 2,4'-bis(1-hydroxyphenyl)valeric acid. Mixtures of these polyols can be used if desired.

Useful water-soluble or water-dispersible anionic polyether polyurethanes can be prepared by preparing prepolymers having a relatively low molecular weight and small excess of isocyanate groups and chain-extending with a chain extender the prepolymers into high molecular weight polyurethane during the dispersion process as described for example in [0045]-[0049] of U.S. Patent Application Publication 2008/0207811 (noted above) the disclosure of which is incorporated herein by reference.

The acidic groups in the anionic polyether polyurethanes useful in this invention can be at least partially and up to 100% neutralized (converted into salts) using monovalent inorganic bases such as alkaline metal hydroxides or organic amines such as dimethylethanolamine.

Anionic acrylic polymers and anionic styrene-acrylic polymers that are useful in the present invention are generally water-soluble or water-dispersible due to the presence of anionic groups distributed throughout the polymeric backbone. Such water-solubilizing anionic groups can include sulfonic acid groups and carboxylic acid groups. For these polymers, the term "water-soluble" is meant herein that when the anionic acrylic polymer or anionic styrene-acrylic polymer is dissolved in water and when such polymer is at least partially neutralized with an inorganic monovalent base or an organic amine base, the resultant solution is visually clear.

Ethylenically unsaturated polymerizable monomers ("monomers") useful for making useful anionic acrylic polymers include but are not limited to, methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, butadiene, isoprene, N,N-dimethyl acrylamide, acrylic acid, methacrylic acid, chloromethacrylic acid, maleic acid, and derivatives thereof. Other useful ethylenically unsaturated polymerizable monomers include other compounds that are described in [0055] of U.S. Patent Application Publication 2008/0207811 (noted above). The anionic acrylic polymers can comprise recurring units derived from the one or more of the noted monomers that are arranged in blocks or in random fashion along the polymer backbone.

The anionic styrene-acrylic polymers can be derived from at least one or more acrylic monomers (as described above) and at least one or more styrene monomers (including styrene and derivatives thereof) in blocks or the same recurring units or randomly occurring recurring units.

The anionic acrylic polymers and anionic styrene-acrylic polymers can have a weight average molecular weight ($M_w$) of at least 1,000 Daltons up to and including 100,000 Daltons or typically of at least 1,000 Daltons and up to and including 50,000 Daltons as measured for example using gel permeation chromatography. In some embodiments, the molecular weight can be at least 1500 Daltons and up to and including 20,000 Daltons. In some other embodiments, combinations of anionic acrylic polymers and anionic styrene-acrylic polymers can be used in which at least one anionic acrylic polymer or anionic styrene-acrylic polymer has a molecular weight of at least 2,000 Daltons and up to and including 10,000 Daltons and at least one other anionic acrylic polymer or anionic styrene-acrylic polymer in the combination has a molecular weight greater than 10,000 Daltons.

The anionic acrylic polymers and anionic styrene-acrylic polymers can be prepared using emulsion polymerization, solution polymerization, or bulk polymerization techniques that are well known in the art. In addition, the acidic groups in such polymers can be at least partially neutralized in a manner like neutralization of the anionic polyether polyurethanes described above. Representative anionic acrylic polymers and anionic styrene-acrylic polymers useful in the present invention are described for example in [0061] of U.S. Patent Application Publication 2008/207811 (noted above). Examples of useful anionic styrene-acrylic polymers include those commercially available under the trademarks JONCRYL® (S.C. Johnson Co.), TRUDOT® (Mead Westvaco Co.), and VANCRYL® (Air Products and Chemicals, Co.).

The aqueous particle-free inkjet ink compositions of the present invention can comprise one or more humectants that are generally water soluble or water miscible organic solvents and have a viscosity that is greater than 40 centipoises or even at least 100 centipoises when measured at 25° C. using a conventional viscometer. For example, any water-soluble humectant known in the inkjet art that is compatible with the other requirements of the invention can be used. By water-soluble is meant that a mixture of the employed humectant(s) and water is homogeneous and visually clear. While an individual humectant can be employed, mixtures of two or more humectants, each of which imparts a useful property, can be used. Representative examples of humectants useful in the aqueous particle-free inkjet ink compositions include but are not limited to the following compounds:

(1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol;

(2) polyhydric alcohols (polyols), such as ethylene glycol, diethylene glycol, triethylene glycol, tetraethylene glycol, propylene glycol, dipropyleneglycol, each polyethylene glycol and polypropylene glycol independently having an average molecular weight of at least 200 and up to and including 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols and thioglycol;

(3) polyoxygenated polyols and their derivatives such as glycerol, diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives;

(4) nitrogen-containing compounds such as urea, 2-pyrrolidone, N-methyl-2-pyrrolidone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone;

(5) sulfur-containing compounds such as 2,2'-thiodiethanol, dimethyl sulfoxide and tetramethylene sulfone; and (6) water soluble N-oxides such as 4-methylmorpholine-N-oxides.

Useful humectants generally have melting points below the typical operating temperature of the intended printer system to avoid the formation of crystalline deposits on the print head or in the maintenance system. Practically, this means that useful humectants have melting points below 30° C. or even below 20° C.

The one or more humectants can be present in an amount of at least of at least 0.25 weight %, or of at least 0.5 weight % and up to and including 10 weight %, or of at least 0.5 weight % and up to and including 8 weight %, all based on the total weight of the aqueous particle-free inkjet ink composition.

The aqueous particle-free inkjet ink compositions of this invention can also include one or more water-miscible co-solvents such as alcohols, lower mono- and di-alkyl ethers derived from polyhydric alcohols, nitrogen-containing compounds such as urea, 2-pyrrolidinone, and 1,3-dimethyl-2-imidazolidinone, and sulfur-containing compounds such as 2,2'-thiodiethanol, dimethyl sulfoxide, and tetramethylene sulfone. The total amounts of such compounds can be at least 0.5 weight % and up to and including 8 weight %, based on the total weight of the aqueous particle-free inkjet ink composition.

In addition, the aqueous particle-free inkjet ink composition of this invention can include one or more film-forming polymers having molecular weight of at least 10,000 Daltons that are different from the anionic polyether polyurethanes, anionic acrylics, and anionic styrene-acrylic polymers described above. Such film forming polymers can be derived from various ethylenically unsaturated polymerization monomers and can be present in an amount of up to and including 10 weight %.

In addition, non-particulate modified polysiloxanes can be present in the aqueous particle-free inkjet ink compositions. Examples of such materials are ethoxylated or propoxylated silicone-based "surfactants" that can be obtained commercially under the trademarks SILWET® (CL Witco), and BYK® (Byk Chemie) such as BYK® 333, 346, 348, 349, and 3455, as well as Dow Corning DC67, DC57, DC28, DC500W, and DC51. Non-silicone surfactants can also be used, including but not limited to anionic, cationic, nonionic, or amphoteric surfactants such as those described in [0065]-[0066] of U.S. Patent Application Publication 2008/0207811 (noted above) or commercially available as SURFYNOL® surfactants (Air Products) including SURFYNOL® 440 and 465 alkynediol surfactants or polymeric surfactants such as commercially available as BYK® 381 and BYK® DYNEWET 800. One or more modified polysiloxanes or non-silicone surfactants can be present in a cumulative amount of up to and including 2 weight %, or up to and including 1 weight %, based on the total weight of the aqueous particle-free inkjet ink composition.

Non-particulate, colorless fluorescent colorants can also be present in the aqueous particle-free inkjet ink compositions and examples of such compounds are described in U.S. Patent Application Publication 2014/0231674 (Cook), the disclosure of which is incorporated herein by reference.

Other additives that can be present in the aqueous colorless inkjet ink compositions, in amounts that would be readily apparent to one skilled in the art, include but are not limited to thickeners, conductivity-enhancing agents, drying agents, waterfast agents, viscosity modifiers, pH buffers, wetting agents, corrosion inhibitors, biocides (such as Kordek and Proxel), fungicides, defoamers, non-silicone surfactants such as some SURFYNOL® surfactants (Air Products) including SURFYNOL 440 and 465 surfactants, UV radiation absorbers, antioxidants, and light stabilizers available under the trademarks TINUVIN® (Ciba) and IRGANOX® (Ciba), as well as other additives described in Col. 17 (lines 11-36) of U.S. Pat. No. 8,455,570 (Lindstrom et al.) the disclosure of which is incorporated herein by reference. Such additives should not be particulate for reasons noted above.

It is essential that the aqueous particle-free inkjet ink compositions of the present invention comprise one or more defoamers (antifoamants), at least one of which has a hydrophilic-lipophilic balance (HLB) value of at least 3 and up to and including 5, or even at least 3 and up to and including 4. Such defoamers are generally present in an amount of at least 0.15 weight % and up to and including 1 weight %, or in an amount of at least 0.2 weight % and up to and including 0.8 weight %, or even at least 0.2 weight % and up to and including 0.7 weight %, all based on the total aqueous particulate-free inkjet ink composition weight.

Examples of such useful defoamers include but are not limited to, SURFYNOL® SE-F (HLB value of 4 to 5), SURFYNOL® OP-340 (HLB value of 4), SURFYNOL® 420 (HLB value of 4), all available from Air Products. Other useful defoamers would be readily determined by considering commercially available compounds that are described as defoamers and as having the required HLB value, and trying such compounds using an evaluation described in the Examples below.

Water is generally present in the aqueous particle-free inkjet ink compositions of the present invention in an amount of at least 75 weight % or of at least 80 weight %, but generally no more than 90 weight %, based on the total weight of the aqueous particle-free inkjet ink composition.

The pH of the aqueous particle-free inkjet ink compositions can be at least 6 and up to and including 12, or more likely of at least 6.5 and up to and including 10, or in some embodiments at least 7 and up to and including 8.5, with or without suitable adjustment. The pH can be achieved using any suitable base such as an organic amine in a suitable amount. Buffers can be included to maintain the desired pH and such materials would be readily apparent to one skilled in the art, including those described in Cols. 17-19 of U.S. Pat. No. 8,455,570 (noted above).

Ink Sets

The aqueous particle-free inkjet ink compositions of this invention can be provided as part of an ink set. As noted above, such aqueous particle-free inkjet ink composition can be an aqueous colorless particle-free inkjet ink composition or it can be an aqueous color particle-free inkjet ink composition containing one or more non-particulate colorants.

The ink sets of this invention can include either one or more an aqueous colorless particle-free inkjet ink compositions or one or more color particle-free inkjet ink compositions. In particularly useful ink sets, at least one aqueous particle-free inkjet ink composition is colorless. Such ink sets can also include one or more aqueous color inkjet ink compositions, each of which comprises at least one visible colorant (described below) to provide an optical density of at least 0.1 (or more likely at least 0.5). For example, each ink set can include for example, one or more aqueous color inkjet ink compositions chosen from an aqueous cyan inkjet ink composition, an aqueous magenta inkjet ink composition, an aqueous yellow inkjet ink composition, and an aqueous black inkjet ink composition, each of which has at least one dispersed dye or pigment colorant suitable to provide the desired hue. Other useful aqueous color inkjet ink compositions can have different hues or "colors" such as orange, red, violet, blue, and green, and thus contain one or more suitable aqueous soluble or aqueous-dispersible dyes or pigments. Aqueous "white" inkjet ink compositions also can be included in such ink sets. Typically, each aqueous color inkjet ink composition in an ink set can comprise one or more inorganic pigment colorants or dyes to provide desired hue.

A useful aqueous color inkjet ink composition that can be included in an ink set is an aqueous green inkjet ink composition for example, as described in copending and commonly assigned U.S. Ser. No. 15/092,642 (filed Apr. 7, 2016), the disclosure of which is incorporated herein by reference. Such aqueous green inkjet ink compositions comprise a unique combination of a green copper phthalocyanine pigment and a yellow azo-coupled β-ketoamide pigment, and the green and yellow pigments particle size is generally less than 150 nm.

Each of the aqueous color inkjet ink compositions useful herein also can be provided with the various materials that are known to be included for this purpose, including surfactants, humectants or co-solvents, polymers (including core-shell polymers as described in Col. 13, lines 26-39 of U.S. Pat. No. 8,455,570 (noted above), anionic polyether polyurethanes, anionic acrylic polymers, anionic styrene-acrylic polymers, biocides, thickeners, non-colored particles, defoamers, and other materials that are described above for the aqueous particle-free inkjet ink compositions.

A wide variety of dyes or organic and inorganic pigment colorants can be used individually or in combination for these aqueous color inkjet ink compositions. For example, a carbon black pigment can be combined with a differently colored pigment such as a cyan copper phthalocyanine or a magenta quinacridine pigment. Useful pigment colorants are described for example in U.S. Pat. No. 5,026,427 (Mitchell et al.), U.S. Pat. No. 5,141,556 (Matrick), U.S. Pat. No. 5,160,370 (Suga et al.), and U.S. Pat. No. 5,169,436 (Matrick), the disclosures of all of which are incorporated herein by reference.

For example, useful pigment colorants include but are not limited to, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, quinacridone pigments, polycyclic pigments, phthalocyanine pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium dioxide, iron oxide, and carbon blacks. Useful pigment colorants are also described in Col. 10 (lines 66) to Col. 11 (line 40) of U.S. Pat. No. 8,455,570 (noted above).

The useful pigment colorants can be accompanied by suitable polymeric or non-polymeric dispersants that are well known in the art, or the pigment colorants can be self-dispersing and thus dispersible and stable in the aqueous color inkjet ink compositions without the use of dispersants because of the presence of appropriate surface groups. Examples of useful self-dispersing pigment colorants are described in Col. 11 (lines 49-53) of U.S. Pat. No. 8,455,570 (noted above).

Useful pigment colorants can have a median particle diameter of less than 150 nm and more likely less than 100 nm or even less than 50 nm. As useful herein, the term "median particle diameter" refers to the $50^{th}$ percentile of the classified particle size distribution such that 50% of the volume of the particles is provided by particles having diameters smaller than the indicated diameter. A conventional laser light scattering device can be used to measure the particle size distributions.

Organic pigment colorants can be present in each aqueous color inkjet ink compositions in an amount of at least 0.1 weight % and up to and including 30 weight %, or more likely of at least 1 weight % and up to and including 10 weight %, or even of at least 1 weight % and up to and including 8 weight %, based on the total weight of the aqueous color inkjet ink composition.

Alternative to pigment colorants, aqueous color inkjet ink compositions can be particle-free and include one or more aqueous-soluble dyes that are well known in the art, for example as described in Col. 12 (lines 4-55) of U.S. Pat. No. 8,455,570 (noted above).

Each of the aqueous color inkjet ink compositions can have a pH of at least 6 and up to and including 10, or of at least 6.5 and up to and including 9.5, as described above for the aqueous particle-free inkjet ink compositions, using suitable bases and buffer systems.

Each aqueous color inkjet ink composition can have suitable viscosity of at least 1 centipose (0.001 N-sec) but generally less than 5 centipoises (0.005 N-sec) or even equal to or less than 3 centipoises (0.003 N-sec), all measured at 25° C. using a suitable viscometer.

The aqueous particle-free inkjet ink compositions and aqueous color inkjet ink compositions described herein can be prepared by dispersing or dissolving suitable colorants (if present) in water, and mixing the colorants and other noted materials in suitable amounts. Examples of how aqueous particle-free inkjet ink compositions can be prepared are provided below for the working Examples.

Methods of Inkjet Printing

The present invention can be practiced by forming (such as ink jet printing) an aqueous particle-free inkjet ink composition alone or in combination with an aqueous color inkjet ink composition onto a suitable substrate (described below). If one of the compositions is a color composition, a colored image can be formed on the substrate using any suitable application means and can be used to provide both colored areas (printed areas) and non-colored areas (areas without any color, or non-color printed areas) on the substrate.

In most embodiments, ink jet printing is carried out using thermal or piezoelectric drop-on-demand (DOD) printheads or continuous (CIJ) printheads. Each type of printhead and apparatus attached thereto require specific properties in the compositions in order to achieve reliable and accurate inkjet printing of each composition (whether colorless of color).

Thus, the method of this invention for inkjet printing can comprise:

providing a substrate, ink jetting an aqueous particle-free inkjet ink composition of this invention onto the substrate from a recirculating main fluid supply containing the aqueous particle-free inkjet ink composition.

In some embodiments, the method can include:

providing a colored image on the substrate, the colored image comprising colored areas and non-colored areas on the substrate, and ink jetting an aqueous particle-free inkjet ink composition (that is colorless as described herein) as colorless printed drops to provide a colorless image on at least a portion of the colored image on the substrate.

For example, the aqueous particle-free inkjet ink composition can be ink jet printed to provide a colorless image over at least 50% of the colored areas of the colored image and over (or overlying or superimposed upon) up to and including 100% of the non-colored areas of the colored image (for example, a predetermined areal percentage of the colored image. In most embodiments, less than 100% of the non-colored areas are covered using the aqueous particle-free inkjet ink composition that is colorless.

The aqueous particle-free inkjet ink composition can be applied in a suitable ink jetting manner. Multiple compositions can be applied simultaneously or sequentially. By a "manner overlying," it is meant that two or more inkjet ink compositions are applied to the substrate closely enough to be in reactive association thereby enabling electrostatic cross reaction between the distinctly charged particles in the two distinct inkjet ink compositions.

For example, in many embodiments, the aqueous particle-free inkjet ink composition (that can be colorless) and one or more aqueous color inkjet ink compositions have dedicated delivery channels to avoid having oppositely charged materials in the multiple inkjet ink compositions interact until they come into reactive association on the intended substrate. The aqueous particle-free inkjet ink composition can be applied (ink jet printed) either in the same pass in-line with the one that provides one or more aqueous color inkjet ink compositions, or in a separate pass.

When the method is carried out using CU apparatus and processes, it comprises:

supplying the aqueous particle-free inkjet ink composition as a continuous stream from the recirculating main fluid supply, during ink jetting printing, breaking the continuous stream into both printing ink drops and non-printing ink drops; and collecting and returning the non-printing drops to the recirculating main fluid supply.

Such method embodiments can be carried out using a continuous inkjet printing apparatus comprising the noted recirculating main fluid supply.

Once the aqueous particle-free in jet ink composition (as well as any aqueous color inkjet ink compositions) is applied to the substrate, the aqueous particle-free inkjet ink composition can be suitably dried.

A colored image can be provided on a substrate as part of a CU method of this invention, comprising:

delivering an aqueous color inkjet ink composition from a first main fluid supply as a continuous stream that is broken into both color printing drops and non-printing color drops;

collecting and returning the non-printing color drops to the first main fluid supply;

delivering an aqueous colorless particle-free inkjet ink composition from a different main fluid supply as a continuous stream that is broken into both printing colorless drops and non-printing colorless drops; and collecting and returning the non-printing colorless drops to the different main fluid supply.

Ink jetting, especially for CIJ operations, can be carried out at a suitable drop generation frequency of at least 100 kHz or at least 350 kHz with a near nozzle velocity of at least 10 m/sec or at least 15 msec. More likely, the drop generation frequency is at least 350 kHz and up to and including 1000 kHz at a near nozzle velocity of at least 15 msec and up to and including 25 m/sec.

The aqueous particle-free inkjet ink composition and any of the aqueous color inkjet ink compositions can be positioned in any one of the printhead ports intended for use in carrying out the present invention. The printhead containing the aqueous particle-free inkjet ink composition can be positioned on the same carriage assembly as the one used for the aqueous color inkjet ink compositions, or it can be positioned on a separate carriage assembly.

The method can be carried out to provide a suitable inkjet ink image (both colored and colorless) on a suitable substrate (also known in the art as "receiver" or "receiver element"). Any individual substrate will have what would be understood as a total "printable" area onto which a composition can be ink jet printed using suitable equipment and processes. The present invention can be used to apply an aqueous color inkjet ink composition and an aqueous colorless inkjet ink composition over a predetermined or areal percentage of the total printable area including both colored areas and non-colored areas of a colored image. Thus, the predetermined or areal percentage of the substrate to be covered by any individual inkjet ink composition according to this invention can be as low as 0.5% and up to and including 100%, but more likely at least 10% and up to and including 100%.

Suitable substrates can include but are not limited to, photoglossy receivers or plain paper receivers such as bright white inkjet papers that are available from a number of commercial sources (as described for example, in Col. 13, lines 28-34 of U.S. Pat. No. 8,187,371, noted above). The photoglossy receivers (also known as swellable media or microporous media) can be manufactured with a coated layer on an underlying paper support and are also useful for providing photographic quality inkjet printed images. Some details of such substrates are provided in Col. 13 (lines 37-51) of U.S. Pat. No. 8,187,371 (noted above). Plain papers can be treated with multivalent salts during or after manufacture as is well known in the art. Other useful substrates are described in U.S. Pat. No. 6,045,917 (Missell et al.), U.S. Pat. No. 5,605,750 (Romano et al.), U.S. Pat. No. 5,723,211 (Romano et al.), and U.S. Pat. No. 5,789,070 (Shaw-Klein et al.).

Useful paper substrates include plain bond papers, surface-treated papers, coated or calendared business gloss papers, resin-coated papers, laminated substrates comprising both paper layers and polymeric film layers such as polyester film layers, and heavy stock papers. It is also possible to use fabrics, cardboard, plastic films (such as polyester films), microporous materials, and any other substrate material known in the art. The substrate can be transparent, translucent, or opaque. The substrate can be in the form of a rigid or semi-rigid sheet or formed as a flexible material into a wound roll.

The durability and other properties of printed colorless and color images provided according to this invention can be improved by using substrates that have been pretreated with a composition to enhance the quality of the inkjet printed colorless and color images. This pretreatment is typically done prior to incorporation of the substrate into the inkjet printing apparatus (such as a continuous inkjet printing apparatus), but in some instances, the substrate can be pretreated within the apparatus before application of the aqueous colorless inkjet ink composition. One or both planar sides of a substrate can be pretreated, or one side can be pretreated and the opposite surface left untreated.

For example, the substrate can be pretreated with a pretreatment composition comprising a water-soluble multivalent metal ion salt, such as but not limited to, a salt comprising one or more multivalent cations including calcium, magnesium, barium, zinc, and aluminum cations, with calcium and magnesium cations being particularly useful. Examples of useful multivalent metal cation salts include but are not limited to, calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Other useful salts could be determined by a skilled artisan, and one or more of such multivalent metal cation salts can be used in the pretreatment composition in an amount that would be readily apparent to one skilled in the art.

Such pretreatment compositions can also comprise a cationic polyelectrolyte comprising amidine moieties, and the details of such compounds and their useful amounts are provided in U.S. Pat. No. 8,562,126 (Xiang et al.), the disclosure of which is incorporated herein by reference.

Besides using an inkjet printer apparatus (such as a continuous inkjet printer apparatus), the various aqueous particle-free inkjet ink compositions of this invention can also be applied using other mechanical techniques including but not limited to, rod coating, blade coating, gravure coating, flexographic printing, extrusion hopper coating, curtain coating, and spray coating.

A resulting printed substrate (or printed receiver element) can be any suitable article including but not limited to, documents, paper currency, postage stamps, various packaging materials, fabrics, polymeric films or sheets, labels for clothing, perfume and wine bottles labels, lottery tickets, passports, driver's licenses, and other articles that would be readily apparent to one skilled in the art using the teaching provided herein.

It is highly desirable in the practice of the present invention that the aqueous colorless particle-free inkjet ink composition be applied over at least 50% of a colored image as spaced colorless drops to provide an increase in glossiness on the colored areas, non-colored areas, or both colored areas and non-colored areas, of the colored image of at least 3 gloss units, or at least 5 gloss units, and up to and including 40 gloss units, as measured by a 75° glossmeter, compared to such colored areas or non-colored areas without, or before application of, the aqueous colorless particle-free inkjet ink composition. Such glossmeters can be obtained from several commercial sources. One such instrument useful for measuring glossiness for the present invention is a BYK-Gardner 75° glossmeter. Similar gloss improvements can be determined at 20°, 60°, and 85° using appropriate instrumentation. The angle of gloss measurement may be varied depending upon the type of substrate used in the present invention. In general, higher gloss can be achieved using higher coverages of the aqueous colorless inkjet ink compositions, but glossiness can also be adjusted by using different combinations of the essential anionic polyether polyurethanes and anionic acrylic or anionic styrene-anionic polymers described above. Routine experimentation would enable a skilled artisan to achieve a desired increase in glossiness for a given use.

It is also useful that the printing colorless drops of an aqueous colorless particle-free inkjet ink compositions be dried on the substrate in a suitable manner after they have been applied for example by ink jet printing.

Some embodiments of the aqueous particle-free inkjet printer ink compositions are designed specifically for use in a continuous inkjet printer, in which a main fluid supply is provided with a desired amount of the composition, which is then pumped from the main fluid supply to a drop generator mechanism such as one or more inkjet print heads, where a continuous stream of the composition is ejected from the drop generator mechanism, which continuous stream then is broken into printing and non-printing drops.

One sub-system common to most CIJ apparatus and methods and to some of the more recent DOD printing systems, is a recirculating fluid system that constantly recirculates an aqueous inkjet ink composition, whether it be the aqueous particle-free inkjet ink composition or an aqueous color inkjet ink composition. For the aqueous color inkjet ink compositions that can be used in the method of this invention, the median particle size of the color pigments and the overall stability of the color pigment particle dispersion, are important features due to the potentially abrasive nature of color pigment particle dispersions. Larger particles or less stable particle dispersions are more prone to cause premature wear or failure of the components of the inkjet printing system and fluid sub-system.

In some embodiments of the present invention, the aqueous particle-free inkjet printer ink composition is printed by employing a plurality of drop volumes (or drop size) formed from the continuous fluid stream, with non-printing drops of a different volume than printing drops being diverted by a drop deflection means into a gutter for recirculation, as disclosed for example in U.S. Pat. No. 6,588,888 (noted above), U.S. Pat. No. 6,554,410 (Jeanmaire et al.), U.S. Pat. No. 6,682,182 (Jeanmaire et al.), U.S. Pat. No. 6,793,328 (Jeanmaire), U.S. Pat. No. 6,517,197 (Hawkins et al.), U.S. Pat. No. 6,866,370 (Jeanmaire), and U.S. Pat. No. 6,575,566 (Jeanmaire et al.), U.S. Patent Application Publication 2003/0202054 (Jeanmaire et al.) the disclosures of all of which are incorporated herein by reference.

In other embodiments, the aqueous particle-free inkjet ink composition is printed onto at least part of the substrate using an apparatus capable of controlling the direction of the formed printing and non-printing drops by asymmetric application of heat to the continuous stream of the aqueous particle-free inkjet ink composition that initializes drop break-up and serves to steer the resultant drops, as disclosed for example in U.S. Pat. No. 6,079,821 (Chwalek et al.) and U.S. Pat. No. 6,505,921 (Chwalek et al.), the disclosures of both of which are herein incorporated by reference. Useful agitation of the aqueous particle-free inkjet ink composition, heated main fluid supply, and inkjet print head and composition filtration means for CIJ ink compositions are described for example in U.S. Pat. No. 6,817,705 (Crockett et al.), the disclosure of which is incorporated herein by reference. Printer replenishing systems for maintaining quality of the aqueous particle-free inkjet ink composition and to counter the effects of volatile component evaporation are described in U.S. Pat. No. 5,526,026 (Bowers) and U.S. Pat. No. 5,473,350 (Mader et al.), the disclosures of which are incorporated herein by reference, and in EP 0 597 628 A1 (Loyd et al.).

It can be useful to regularly replenish the main fluid supply with additional aqueous particle-free inkjet ink composition described herein to keep the reservoir at a desired level during inkjet printing. Alternatively, water can be added to the main fluid supply to compensate for evaporation during inkjet printing. A skilled worker in the art would understand how to accomplish these operations using the teaching provided in the art noted above.

The present invention provides at least the following embodiments and combinations thereof, but other combinations of features are considered to be within the present invention as a skilled artisan would appreciate from the teaching of this disclosure:

1. An aqueous particle-free inkjet ink composition that has a viscosity of less than 5 centipoises (0.005 N-sec) at 25° C., and comprises:

an anionic polyether polyurethane having an acid number of at least 50 and an anionic acrylic polymer or anionic styrene-acrylic polymer having an acid number of at least 50; wherein the weight ratio of the anionic polyether polyurethane to the anionic acrylic polymer or anionic styrene-acrylic polymer is from 1:9 to and including 9:1, and the total amount of the anionic polyether polyurethane and the anionic acrylic polymer or anionic styrene-acrylic polymer is less than or equal to 20 weight % based on the total aqueous particle-free inkjet ink composition weight, and a defoamer that has a hydrophilic-lipophilic balance value of at least 3 and up to and including 5, which defoamer is present in an amount of at least 0.15 weight % and up to and including 1 weight %, based on the total aqueous particle-free inkjet ink composition weight.

2. The aqueous particle-free inkjet ink composition of embodiment 1 that is an aqueous colorless particle-free inkjet ink composition.

3. The aqueous particle-free inkjet ink composition of embodiment 1 or 2, wherein the defoamer has a hydrophilic-lipophilic balance value of at least 3 and up to and including 4.

4. The aqueous particle-free inkjet ink composition of any of embodiments 1 to 3, wherein the defoamer is present in an amount of at least 0.2 weight % and up to and including 0.8 weight %, based on the total aqueous particle-free inkjet ink composition weight.

5. The aqueous particle-free inkjet ink composition of any of embodiments 1 to 4, comprising a mixture of at least one anionic acrylic polymer or anionic styrene-acrylic polymer, having a molecular weight of at least 2,000 and up to and including 10,000 Daltons, and at least one anionic acrylic polymer or anionic styrene-acrylic polymer having a molecular weight greater than 10,000 Daltons.

6. The aqueous particle-free inkjet ink composition of any of embodiments 1 to 5, wherein the weight ratio of the anionic polyether polyurethane to the anionic acrylic polymer or the anionic styrene-acrylic polymer is from 1:3 to and including 3:1.

7. The aqueous particle-free inkjet ink composition of any of embodiments 1 to 6, wherein a total amount of the anionic polyether polyurethane and the anionic acrylic polymer or the anionic styrene-acrylic polymer is at least 5 weight % and up to and including 18 weight %, based on the total aqueous particle-free inkjet ink composition weight.

8. The aqueous particle-free inkjet ink composition of any of embodiments 1 to 7 further comprises at least 0.25 weight % and up to and including 10 weight % of a humectant, based on the total aqueous colorless inkjet ink composition weight.

9. The aqueous particle-free inkjet ink composition of any of embodiments 1 to 8, wherein the anionic acrylic polymer or the anionic styrene-acrylic polymer has a weight average molecular weight of at least 1,000 and up to and including 50,000, and comprises carboxy groups.

10. The aqueous particle-free inkjet ink composition of any of embodiments 1 to 9, wherein the polyether polyurethane has an acid number of at least 60 and up to and including 150, and the anionic acrylic polymer or the anionic styrene-acrylic polymer has an acid number of at least 120 and up to and including 240.

11. The aqueous particle-free inkjet ink composition of any of embodiments 1 to 10, further comprising a modified polysiloxane in an amount of up to and including 1 weight %, based on the total aqueous particle-free inkjet ink composition weight.

12. The aqueous particle-free inkjet ink composition of any of embodiments 1 to 11, comprising less than 0.2 weight % of a wax based on the total aqueous particle-free inkjet ink composition weight.

13. The aqueous particle-free inkjet ink composition of any of embodiments 1 to 12, comprising less than 0.15 weight % of a wax based on the total aqueous particle-free inkjet ink composition weight.

14. The aqueous particle-free inkjet ink composition of any of embodiments 1 to 13, comprising water in an amount of at least 85 weight %, based on the total aqueous particle-free inkjet ink composition weight.

15. The aqueous particle-free inkjet ink composition of any of embodiments 1 to 14, comprising a non-particulate colorant.

16. An ink set comprising at least the following individual inks:

1) the aqueous particle-free inkjet ink composition of any of embodiments 1 to 15; and 2) an aqueous color inkjet ink composition that comprises at least one colorant.

17. The ink set of embodiment 16, wherein the aqueous color inkjet ink composition that comprises at least one colorant is one of the following compositions:

an aqueous cyan inkjet ink composition, an aqueous magenta inkjet ink composition, an aqueous yellow inkjet ink composition, or an aqueous black inkjet ink composition.

18. The ink set of embodiment 16 or 17, comprising each of the following aqueous color inkjet ink compositions:

an aqueous cyan inkjet ink composition, an aqueous magenta inkjet ink composition, an aqueous yellow inkjet ink composition, and an aqueous black inkjet ink composition.

19. The ink set of any of embodiments 16 to 18, wherein the aqueous particle-free inkjet ink composition is an aqueous colorless particle-free inkjet ink composition.

20. The ink set of any of embodiments 16 to 19, wherein the aqueous color inkjet ink composition comprises a non-particulate colorant.

21. A method of inkjet printing, comprising:
providing a substrate,
ink jetting the aqueous particle-free inkjet ink composition of any of embodiments 1 to 15 onto the substrate from a recirculating main fluid supply containing the aqueous particle-free inkjet ink composition.

22. The method of embodiment 22, comprising:
supplying the aqueous particle-free inkjet ink composition as a continuous stream from the recirculating main fluid supply,
during ink jetting, breaking the continuous stream into both printing ink drops and non-printing ink drops; and
collecting and returning the non-printing drops to the recirculating main fluid supply.

23. The method of embodiment 21 or 22, carried out using a continuous inkjet printing apparatus comprising the recirculating main fluid supply.

24. The method of any of embodiments 21 to 23, wherein the ink jetting is carried out at a drop generation frequency of at least 100 kHz with a near nozzle velocity of at least 10 msec.

25. The method of any of embodiments 21 to 24, wherein the aqueous particle-free inkjet ink composition has a static surface tension of less than 38 dynes/cm when measured by the Wilhelmy Plate method.

26. The method of any of embodiments 21 to 25 comprising:
ink jetting the aqueous particle-free inkjet ink composition that is colorless, as colorless printing drops to provide increased glossiness of colored areas or non-colored areas of a colored image by at least 3 gloss units compared to the glossiness of the colored areas or non-colored areas of the colored image without the colorless aqueous particle-free inkjet ink composition, as measured by a 75° glossmeter.

The following Examples are provided to illustrate the practice of this invention and are not meant to be limiting in any manner. In these Examples, the described aqueous particle-free inkjet ink compositions were prepared and evaluated for various necessary properties.

Comparative Example 1

The following components were added into a 200 ml high density polyethylene bottle while carrying out magnetic stirring: 5.88 g of JONCRYL® 60 anionic styrene-acrylic polymer (34 weight % solution), 50.0 g of JONCRYL® HPD 696-DMEA anionic styrene-acrylic polymer (20 weight % solution), 24.0 g of the polyether polyurethane (PEPU-1-DMEA, 25 weight %) prepared as described in U.S. Pat. No. 8,430,492 (noted above), 5.0 g of triethylene glycol as a humectant, 0.4 g of DC62 (HLB value of less than 3; Dow Corning) as a defoamer, 0.04 g of DC67 (Dow Corning) as a surfactant, 0.36 g of DC28 (Dow Corning) as another surfactant, 0.6 g of a 9.5 weight % solution of the biocide Kordek MLX, 0.2 g of anticorrosive agent COBRATEC® TT 50S, and 113 g of high purity water. The resulting solution (200 g) was stirred for 1 hour to provide a comparative aqueous colorless particle-free inkjet ink composition.

Comparative Example 2

This comparative aqueous colorless particle-free inkjet ink composition was prepared similarly to Comparative Example 1, except it was submitted to a filtration step using a conventional 1.2 μm polypropylene filter ("PP").

Comparative Example 3

This comparative aqueous colorless particle-free inkjet ink composition was prepared similar to Comparative Example 1, except it was submitted to a filtration step using a conventional 0.45 μm glass fiber filter ("GL").

Comparative Example 4

This comparative aqueous colorless particle-free inkjet ink composition was prepared similar to Comparative Example 1, except it was submitted to a filtration step using a conventional 0.45 μm nylon filter ("NYL").

Comparative Example 5

This comparative aqueous colorless particle-free inkjet ink composition was prepared similarly to Comparative Example 1, except 0.4 g of the organic polyamide defoamer, BYK® 1640 (HLB value less than 3, from Byk Chemie), was used in place of DC62. The composition was submitted to a filtration step using a 0.45 μm glass fiber filter ("GL").

Comparative Example 6

This comparative aqueous colorless particle-free inkjet ink composition was prepared similarly to Comparative Example 1, except 0.4 g of the organic oil defoamer, AIRASE® 4500 (HLB value less than 3; from Air Products) was used in place of DC62. This composition was not filtered.

Comparative Example 7

This comparative aqueous colorless particle-free inkjet ink composition was prepared similarly to Comparative Example 6, except it was submitted to a filtration step using a 1.2 μm polypropylene filter ("PP").

DISCUSSION

Comparative Example 1 included a conventional defoamer, a modified polysiloxane having a HLB value of less than 3. As can be seen in the following TABLE I, the foam level was effectively reduced. However, using this aqueous inkjet ink composition in a CIJ press requires that it be stable to repeated filtrations. Filtering with glass fiber ("GF") or nylon ("NYL") filters of a porosity typically used on a CIJ press (see Comparative Examples 3 and 4), removed the hydrophobic defoamer via adsorption, resulting in the foam level dramatically increasing, even after 1 filtration. A single filtration using a polypropylene filter ("PP"; see Comparative Example 2) partially removed the defoamer, but enough remained to adequately control the foam. However, continuous filtration resulted in continued removal of the defoamer with concomitant increase in the foam level in the composition.

As can be seen in TABLE I, Comparative Examples 1 and 2 containing the conventional defoamer at adequate residual levels for defoaming, did not inkjet print well, exhibiting higher than acceptable numbers of small drop mergers. Comparative Examples 3 and 4 showed improved drop formation characteristics, but the defoamer was largely been removed via filtration, resulting high foam levels. Comparative Example 5 included a conventional defoamer of a different class, that is an organic polyamide (HLB value of less than 3). Similar to Comparative Example 3, the defoamer was removed during filtration with a glass fiber filter, resulting in unacceptably high foam levels for use in a CIJ inkjet printing system. Comparative Example 6 included a conventional defoamer of another class, an organic oil (HLB value of less than 3). The unfiltered composition had adequately low foam levels, but the ink jetted composition exhibited poor drop formation and high numbers of small drop mergers. Comparative Example 7 illustrates that the defoamer utilized in Comparative Example 6 was removed during filtration with the polypropylene filter, resulting in unacceptably high foam levels for use in a CIJ inkjet printing system that include continuous recirculation and filtration.

TABLE I

Filtration Data - Foam Level (in ml) at 20 minutes of Aeration

| Example | Defoamer | Unfiltered | Filtered (1.2 µm PP) | Filtered (0.45 µm GF) | Filtered (0.45 µm NYL) | Drop Formation |
|---|---|---|---|---|---|---|
| Comparative 1 | DC62 polysiloxane | 110 | | | | poor |
| Comparative 2 | DC62 polysiloxane | | 380 | | | poor |
| Comparative 3 | DC62 polysiloxane | | | >1000 | | good |
| Comparative 4 | DC62 polysiloxane | | | | >1000 | good |
| Comparative 5 | BYK ® 1640 polyamide | | | >1000 | | fair |
| Comparative 6 | AIRASE ® 4500 organic oil | 90 | | | | poor |
| Comparative 7 | AIRASE ® 4500 organic oil | | >1000 | | | fair |

Inventive Example 1

The following components were added into a 200 ml high density polyethylene bottle while carrying out magnetic stirring: 5.88 g of JONCRYL® 60 anionic styrene-acrylic polymer (34 weight % solution), 50.0 g of JONCRYL® HPD 696-DMEA anionic styrene-acrylic polymer (20 weight % solution), 24.0 g of the polyether polyurethane (PEPU-1-DMEA, 25 weight %) prepared as described in U.S. Pat. No. 8,430,492 (noted above), 5.0 g of triethylene glycol as a humectant, 1.0 g of SURFYNOL® SE-F (HLB value of 4-5; Air Products) as a defoamer, 0.04 g of DC67 (Dow Corning) as a surfactant, 0.6 g of a 9.5 weight % solution of the biocide Kordek MLX, 0.2 g of anticorrosive agent COBRATEC® TT 505, and 113 g of high purity water. The resulting solution (200 g) was stirred for 1 hour to provide an aqueous colorless particle-free inkjet ink composition according to the present invention. The composition was filtered through a 1.2 µm conventional polypropylene filter.

Inventive Example 2

This inventive aqueous colorless particle-free inkjet ink composition was prepared similarly to Inventive Example 1, except 1.0 g of SURFYNOL® 420 (HLB value of 4; Air Products) was used as the defoamer instead of SURFYNOL® SE-F.

Inventive Example 3

This inventive aqueous colorless particle-free inkjet ink composition was prepared similarly to Inventive Example 1, except 1.0 g of SURFYNOL® OP-340 (HLB value of 4; Air Products) was used as the defoamer instead of SURFYNOL® SE-F.

Inventive Example 4

An aqueous color (cyan) particle-free inkjet ink composition of the present invention was prepared similar to the aqueous colorless particle-free inkjet ink composition of Inventive Example 1, but the blue dye Liquitint Blue (Milliken Chemical) was added at 2 weight %.

Comparative Example 8

This comparative aqueous colorless particle-free inkjet ink composition was prepared similarly to Inventive Example 1, except 1.0 g of SURFYNOL® 440 (HLB value of 8; Air Products) was used as the defoamer instead of SURFYNOL® SE-F.

Comparative Example 9

This comparative aqueous colorless particle-free inkjet ink composition was prepared similarly to Inventive Example 1, except 1.0 g of SURFYNOL® 465 (HLB value of <13; Air Products) was used as the defoamer instead of SURFYNOL® SE-F.

Comparative Example 10

This comparative aqueous colorless particle-free inkjet ink composition was prepared similarly to Inventive Example 1, except 1.0 g of SURFYNOL® 104 (HLB value of <3; Air Products) was used as the defoamer instead of SURFYNOL® SE-F.

Comparative Example 11

This comparative aqueous colorless particle-free inkjet ink composition was prepared similarly to Inventive Example 1, except 1.0 g of SURFYNOL® DF110 (HLB value of <3; Air Products) was used as the defoamer instead of SURFYNOL® SE-F.

These comparative and inventive aqueous colorless particle-free inkjet ink composition were evaluated for foaming, filtration, or drop formation properties. The foaming evaluations were carried out as follows using a Foam Test Apparatus described as follows and the results are shown below in TABLE II.

Foam Test Procedure:

The Foam Test Apparatus consisted of 1000 ml graduated cylinder, a diffuser arrangement (diffuser stone, air tube with Pall 0.2 μm ABS EMFLON II capsule filter and gasket), a 20-liter constant temperature bath with an immersion circulator (Haake Model E8, mass flow controller (Cole Parmer) and air flow meter (Cole Parmer).

For each evaluation, 200 ml of the aqueous particle-free inkjet ink composition was poured into the 1000 ml graduated cylinder that was then placed into the water bath. Once each sample had reached equilibrium (20 minutes), the composition temperature of 32.2+/−0.5° C. (90° F.) was verified. The diffuser arrangement was placed into the aqueous particle-free inkjet ink composition in the graduated cylinder (the air supply tubing was not attached). The tubing from Cole-Parmer flow meter was then attached to the diffuser assembly. A timer was started when bubbles began to emerge from the diffuser ball, and it was ensured that the Cole-Parmer flow meter was reading 53+/−3 during the evaluation. The height of the foam height was measured as well as the times each height reading was taken. Each evaluation was stopped after 18 minutes. The foam level increase at this time was determined by measuring the top of the foam and subtracting the initial 200 ml composition volume in the graduated cylinder.

TABLE II

HLB Series - Foam Level (ml) at 18 minutes of Aeration after Filtration

| Example | Defoamer | HLB Value | Filtered (1.2 um PP) | Drop Formation |
|---|---|---|---|---|
| Inventive 1 | SURFYNOL ® SE-F | 4-5 | 390 | very good |
| Inventive 2 | SURFYNOL ® 420 | 4 | 480 | very good |
| Inventive 3 | SURFYNOL ® OP-340 | 4 | 480 | very good |
| Inventive 4 | SURFYNOL ® SE-F | 4-5 | 390 | very good |
| Comparative 8 | SURFYNOL ® 440 | 8 | 800 | good |
| Comparative 9 | SURFYNOL ® 465 | 13 | >1000 | fair |
| Comparative 10 | SURFYNOL ® 104 | <3 | >1000 | poor |
| Comparative 11 | SURFYNOL ® DF110 | <3 | >1000 | poor |

As can be seen from the data in TABLE II, aqueous colorless particle-free inkjet ink compositions containing defoamers of similar structure but varying HLB values resulted in different foaming and ink jetting (drop formation) characteristics. Use of defoamers having HLB values of at least 3 and up to and including 5 provided desired control of the foam level and excellent drop formation during inkjet printing. Those comparative compositions containing defoamers with HLB values lower than 3 or greater than 5 either did not control the foam or were largely removed by filtration during recirculation occurring during inkjet printing. SURFYNOL® 440 in Comparative Example 8 provided moderate foam control but it was progressively filtered out of the composition during continuous inkjet printing. Thus, it did not satisfy all of the requirements of the present invention.

The invention has been described in detail with particular reference to certain preferred embodiments thereof, but it will be understood that variations and modifications can be effected within the spirit and scope of the invention.

The invention claimed is:

1. An aqueous colorless particle-free inkjet ink composition that has a viscosity of less than 5 centipoises (0.005 N-sec) at 25° C., and comprises:

an anionic polyether polyurethane having an acid number of at least 50 and an anionic acrylic polymer or anionic styrene-acrylic polymer having an acid number of at least 50; wherein the weight ratio of the anionic polyether polyurethane to the anionic acrylic polymer or anionic styrene-acrylic polymer is from 1:9 to and including 9:1, and the total amount of the anionic polyether polyurethane and the anionic acrylic polymer or anionic styrene-acrylic polymer is less than or equal to 20 weight % based on the total aqueous colorless particle-free inkjet ink composition weight, and a defoamer that has a hydrophilic-lipophilic balance value of at least 3 and up to and including 5, which defoamer is present in an amount of at least 0.15 weight % and up to and including 1 weight %, based on the total aqueous colorless particle-free inkjet ink composition weight.

2. The aqueous colorless particle-free inkjet ink composition of claim 1, wherein the defoamer has a hydrophilic-lipophilic balance value of at least 3 and up to and including 4.

3. The aqueous colorless particle-free inkjet ink composition of claim 1, wherein the defoamer is present in an amount of at least 0.2 weight % and up to and including 0.8 weight %, based on the total aqueous colorless particle-free inkjet ink composition weight.

4. The aqueous colorless particle-free inkjet ink composition of claim 1, comprising a mixture of at least one anionic acrylic polymer or anionic styrene-acrylic polymer having a molecular weight of at least 2,000 and up to and including 10,000 Daltons, and at least one anionic acrylic polymer or at least one anionic styrene-acrylic polymer having a molecular weight greater than 10,000 Daltons.

5. The aqueous colorless particle-free inkjet ink composition of claim 1, wherein a total amount of the anionic polyether polyurethane and the anionic acrylic polymer or the anionic styrene-acrylic polymer is at least 5 weight % and up to and including 18 weight %, based on the total aqueous colorless particle-free inkjet ink composition weight.

6. The aqueous colorless particle-free inkjet ink composition of claim 1, further comprising a modified polysiloxane in an amount of up to and including 1 weight %, based on the total aqueous colorless particle-free inkjet ink composition weight.

7. The aqueous colorless particle-free inkjet ink composition of claim 1, comprising less than 0.2 weight % of a wax based on the total aqueous colorless particle-free inkjet ink composition weight.

8. A method of inkjet printing, comprising:
providing a substrate,
ink jetting the aqueous colorless particle-free inkjet ink composition onto the substrate from a recirculating main fluid supply containing the aqueous colorless particle-free inkjet ink composition,
wherein the aqueous colorless particle-free inkjet ink composition has a viscosity of less than 5 centipoises (0.005 N-sec) at 25° C., and comprises:
an anionic polyether polyurethane having an acid number of at least 50 and an anionic acrylic polymer or anionic styrene-acrylic polymer having an acid number of at least 50; wherein the weight ratio of the anionic polyether polyurethane to the anionic acrylic polymer or anionic styrene-acrylic polymer is from 1:9 to and including 9:1, and the total amount of the anionic polyether polyurethane and the anionic acrylic polymer or anionic styrene-acrylic polymer is less than or equal to 20 weight % based on the total aqueous colorless particle-free inkjet ink composition weight, and
a defoamer that has a hydrophilic-lipophilic balance value of at least 3 and up to and including 5, which defoamer is present in an amount of at least 0.15 weight % and up to and including 1 weight %, based on the total aqueous colorless particle-free inkjet ink composition weight.

9. The method of claim 8, comprising:
supplying the aqueous colorless particle-free inkjet ink composition as a continuous stream from the recirculating main fluid supply,
during ink jetting, breaking the continuous stream into both printing ink drops and non-printing ink drops; and
collecting and returning the non-printing drops to the recirculating main fluid supply.

10. The method of claim 9, carried out using a continuous inkjet printing apparatus comprising the recirculating main fluid supply.

11. The method of claim 8, wherein the ink jetting is carried out at a drop generation frequency of at least 100 kHz with a near nozzle velocity of at least 10 m/sec.

12. The method of claim 8, wherein the aqueous colorless particle-free inkjet ink composition has a viscosity of less than or equal to 3 centipoises (0.003 N-sec) at 25° C.

13. The method of claim 8, wherein the aqueous colorless particle-free inkjet ink composition has a static surface tension of less than 38 dynes/cm when measured by the Wilhelmy Plate method.

14. The method of claim 8 comprising:
ink jetting the aqueous colorless particle-free inkjet ink composition, as colorless printing drops to provide increased glossiness of colored areas or non-colored areas of a colored image by at least 3 gloss units compared to the glossiness of the colored areas or non-colored areas of the colored image without the aqueous colorless particle-free inkjet ink composition, as measured by a 75° glossmeter.

15. An ink set comprising at least the following individual inks:
1) the aqueous colorless particle-free inkjet ink composition of claim 1; and
2) an aqueous color inkjet ink composition that comprises at least one colorant.

16. The ink set of claim 15, wherein the aqueous color inkjet ink composition that comprises at least one colorant is one of the following compositions:
an aqueous cyan inkjet ink composition,
an aqueous magenta inkjet ink composition,
an aqueous yellow inkjet ink composition, or
an aqueous black inkjet ink composition.

* * * * *